United States Patent [19]

Lovell

[11] 4,375,903
[45] Mar. 8, 1983

[54] VEHICLE SUSPENSION SYSTEM AUGMENTER

[76] Inventor: Patrick A. Lovell, 245 S. Heber St., Beckley, W. Va. 25801

[21] Appl. No.: 241,675

[22] Filed: Mar. 9, 1981

[51] Int. Cl.³ .............................................. B60P 1/16
[52] U.S. Cl. .................................. 298/17 S; 280/104
[58] Field of Search ............... 280/6 H, 111, 104, 706, 280/714; 267/65 C, 65 D; 298/17 S

[56] References Cited

U.S. PATENT DOCUMENTS

| | | | |
|---|---|---|---|
| 2,381,425 | 8/1945 | Deal et al. | 298/17 S |
| 2,556,610 | 6/1951 | Biszantz | 298/17 S |
| 2,986,403 | 5/1961 | Ziccardi | 280/104 |
| 3,203,735 | 8/1965 | Vestin | 298/17 S |
| 3,917,307 | 11/1975 | Shoebridge | 280/104 |
| 4,036,528 | 7/1977 | Langendorf | 298/17 S |
| 4,261,616 | 4/1981 | Beegle | 298/17 S |

*Primary Examiner*—Richard A. Bertsch
*Attorney, Agent, or Firm*—Dennison, Meserole, Pollack & Scheiner

[57] ABSTRACT

A vehicle suspension system augmenter includes one or more selectively actuatable hydraulic jacks positioned to elevate the frame of a vehicle with respect to its suspension system on at least one side in order to achieve a leveling function of the frame when the vehicle is on uneven terrain. The system contemplates appropriate brackets and mounting devices to enable the system to be applied during the original construction of the vehicle, or as an after-market item, and further contemplates employing fluid pressure systems already embodied in the vehicle or as auxiliary items. The fluid pressure system may be activated by the operator from the driver station and when in a non-use configuration, the hydraulic jacks are totally disconnected from at least one of the frame or suspension elements, whichever is appropriate.

6 Claims, 17 Drawing Figures

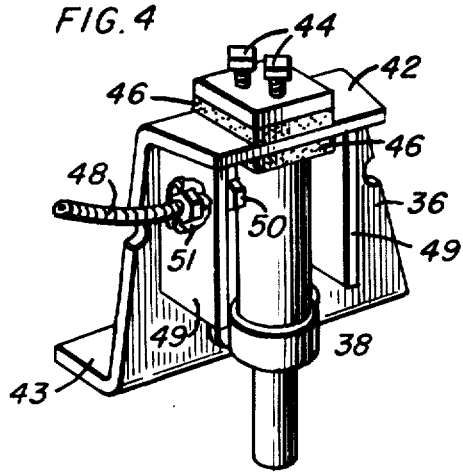
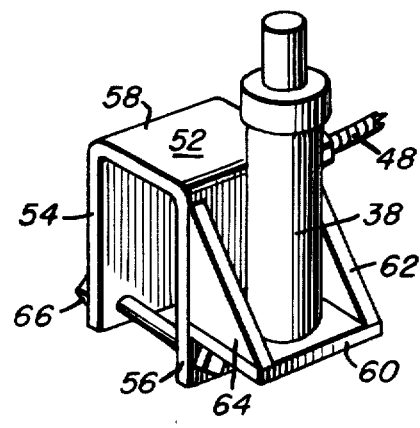
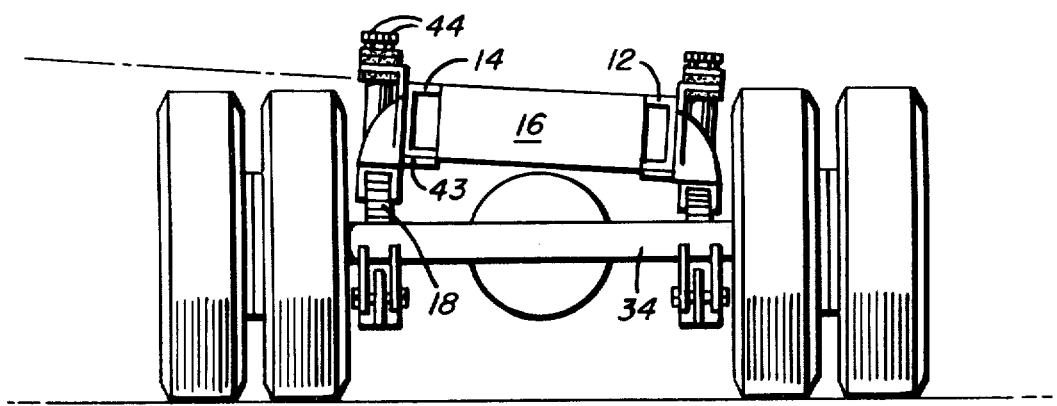
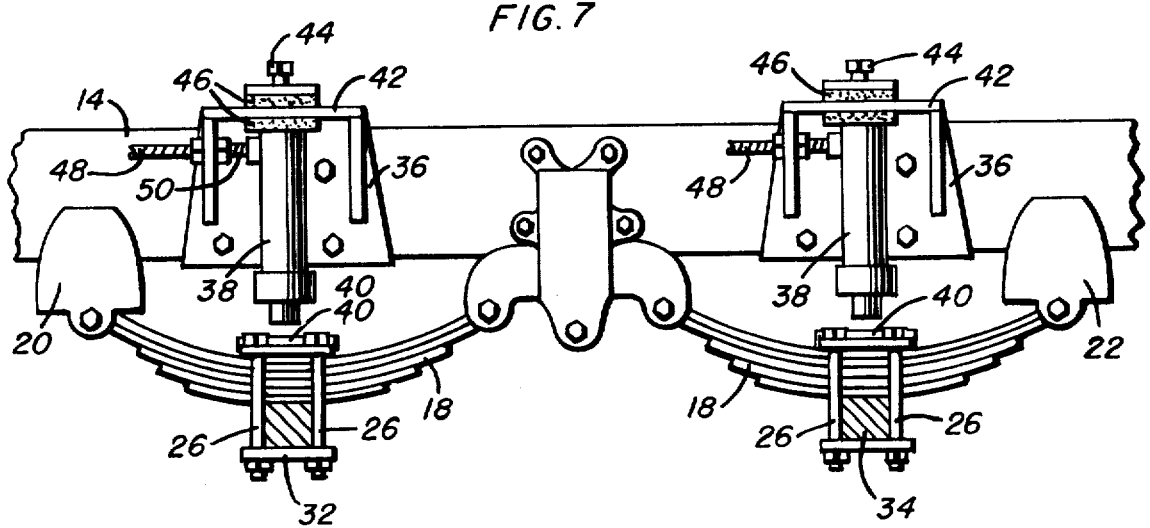

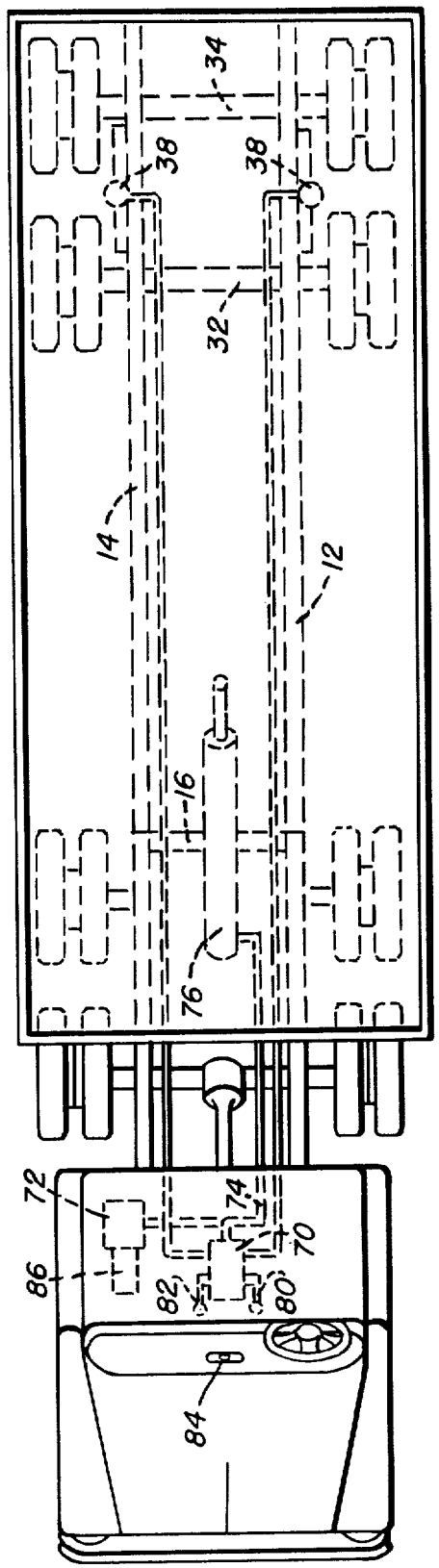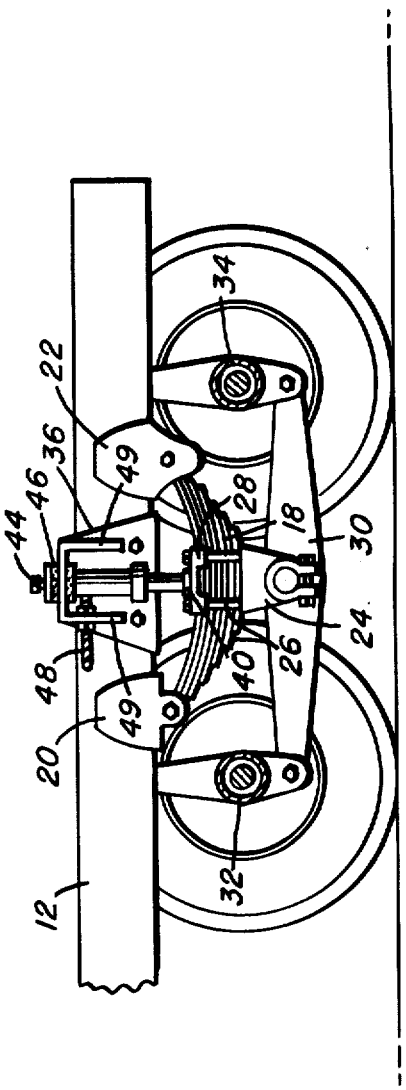

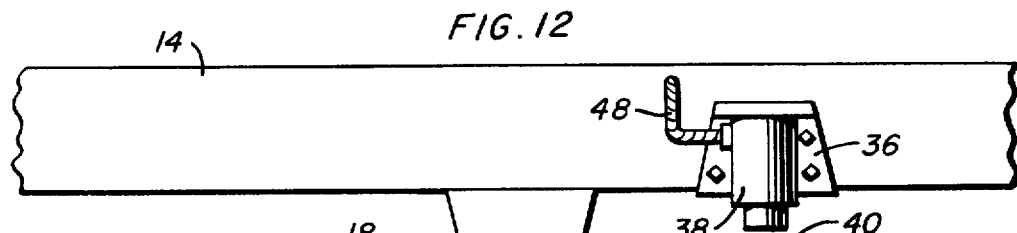
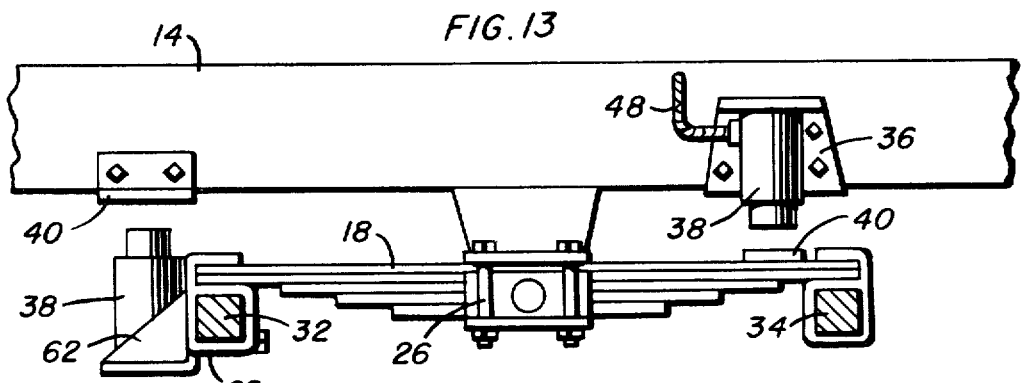
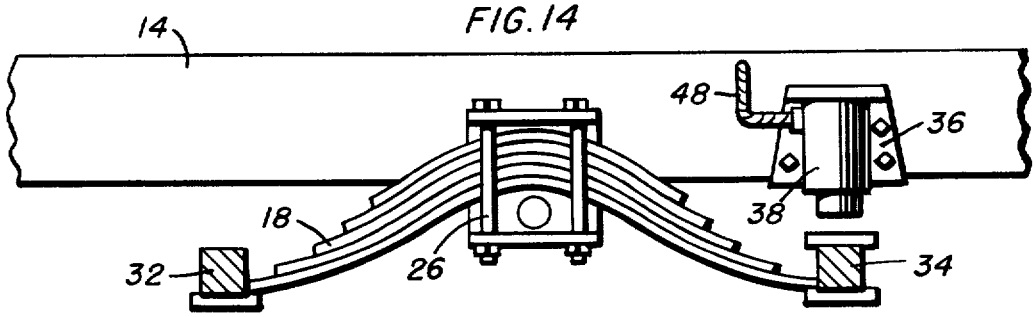
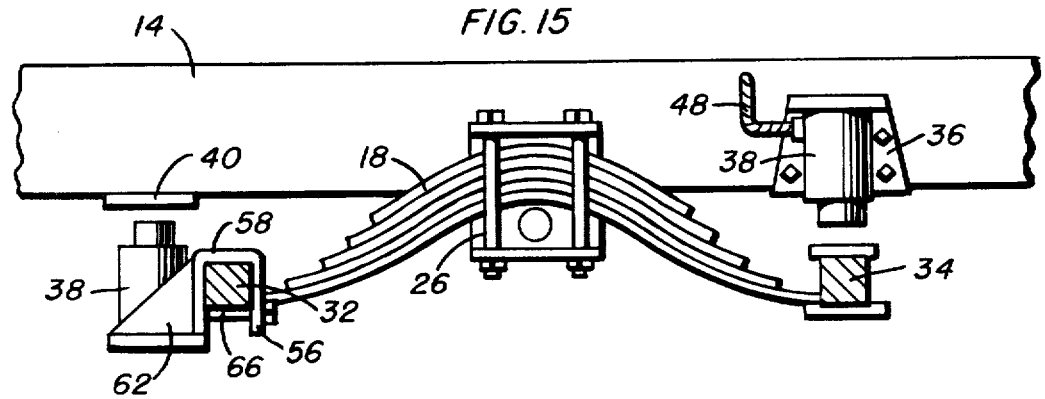

VEHICLE SUSPENSION SYSTEM AUGMENTER

BACKGROUND OF THE INVENTION

This invention relates to vehicle suspension systems and more particularly, to those suspension systems which are normally employed on large dumping trucks and trailers which are utilized to transport heavy loads of loose materials. The vehicles usually include a large elevatable box, bin, or bed within or on which the materials to be transported are placed and a pivoted tailgate which will permit the materials to be discharged from the rear when the box, bin, or bed is elevated.

As the size, and thus the load carrying capability, of dumping trucks and trailers has increased, so has the incidence of damage caused by such truck or trailer bodies tipping over as a result of elevating the dumping box on terrain which is irregular.

It has been recognized that if a large dump truck or trailer is elevated from the transporting to the dumping position with the wheels of the vehicle and their attendant suspension components in other than a substantially level condition, the tendency is to aggravate the out of plumb condition because of the increased height attained by the elevation of the dumping box. Thus, as the dumping box is raised, the forces of gravity tend to force the load to the low side and if the out of level condition is of sufficient magnitude and the load is raised to a point where the center of gravity is sufficiently out of line with the central axis of the vehicle, the truck will tip over, thus causing loss of both load and vehicle with potential substantial damage to the vehicle and injury to the operator.

It has further been recognized that even if the elevation of the load on out of level terrain is insufficient to cause a vehicle to tip over, it may nonetheless result in a twisting force being applied to the vehicle frame sufficient to "rack" the frame out of square and permanently damage the vehicle components.

In order to reduce the incidence of tipping of dumping truck and trailer vehicles of the type contemplated in this application, I have determined that if the angle of deviation of the elevated load body from a vertical axis can be maintained within predetermined acceptable parameters, the loads may be elevated and dumped without damage to the vehicle and without danger of operator injury.

SUMMARY OF THE INVENTION

My invention is directed to selectively augmenting the suspension system to apply leveling forces when needed to the low side of the vehicle to elevate the low side of the vehicle frame with respect to the wheels to bring the frame into a substantially level condition and maintain such level condition throughout the elevating and dumping operation. My invention contemplates applying a lifting force against either the suspension system, when the lifting device is mounted on the frame of the vehicle, or against the frame, when the lifting device is mounted on one of the suspension members, by selective interengagement and force application to the element against which the augmenter will apply a lifting force.

PRIOR ART

The prior art has recognized the problems attendant to tipping of load lifting vehicles and the damage occasioned thereby and has made a number of attempts to avoid such problems by interconnecting force applicators between the frame and the suspension system. Typical examples of the prior art effort will be seen in the patents to Biszantz, No. 2,556,610, and Rush, No. 2,829,901. In both the Rush and Biszantz patents, fluid pressure operated cylinders are mounted between the suspension elements of the vehicle and the frame, as in the case of Biszantz, or a leveling platform or bed, as in the case of Rush.

Both of these teachings have been less than successful in the field because neither of these references, nor any other reference of which I am aware, employs the concept of separating the suspension augmenting system from either the frame or the suspension system, whichever is appropriate, when the augmenting device is not in use. Normally, when vehicles of the character contemplated travel over the road, the augmenting system of my invention is placed in a retracted or non-use position and thus, no forces are transmitted to the augmenting system by the normal manipulations of the frame and suspension system occasioned by surface irregularities encountered in normal over the road operation. In both the Rush and Biszantz patents, the leveling devices or stabilizers are always interconnected between their two supporting components even when no leveling action is undertaken and thus, are subjected to continuous action occasioned by suspension flexure as the loaded and/or unloaded vehicle proceeds from point to point. Such continuous action leads to early failure of the components due to unnecessary wear. My device, on the other hand, specifically disassociates the augmenter from either the frame or the suspension component on which it is carried, whichever is appropriate, except during those periods when a leveling action is needed and the selected component may be elevated by actuation of my augmenting device.

OBJECTS OF THE INVENTION

In view of the foregoing, it is an object of my invention to apply a lifting force to a selected portion of a vehicle frame in order to elevate that portion from an out of level condition to a level condition, or within a predetermined permissible deviation therefrom.

It is a further object of my invention to disconnect my suspension augmenting device from the frame of the vehicle or the suspension system, whichever is appropriate, when leveling action of the vehicle is unnecessary.

It is a further object of my invention to facilitate mounting my suspension augmenting system on vehicles under construction or in the after-market, to vehicles already in service by providing appropriate mounting devices to meet the requirements of virtually all conventional suspension systems in service on dumping vehicles and trailers presently available.

Other objects and advantages of my invention will become apparent from a consideration of the following description taken in connection with the accompanying drawings, in which:

FIG. 4 is a perspective view of one form of my suspension augmenting device and its supporting bracket.

FIG. 5 is a perspective view of a modified form of my suspension system augmenting device and its supporting bracket.

FIG. 6 is a rear view of the suspension system illustrated in FIG. 3 with one augmenting device actuated to elevate one side of the vehicle frame.

FIG. 6A is a fragmentary left side elevation of the suspension system of FIG. 6.

FIG. 7 is a fragmentary side elevation of a suspension of the Dayton or New-Way suspension configuration with my invention applied thereto.

FIGS. 12 and 13 are fragmentary side elevations of modified forms of the illustration shown in FIG. 3.

FIG. 14 is a modified form of the suspension illustrated in FIG. 11 with my invention applied thereto.

FIG. 15 is a fragmentary side elevation of still a further modification of the suspension system illustrated in FIG. 11 with my invention applied thereto.

FIG. 16 is a top plan view of a vehicle illustrating one form of my invention thereon in diagrammatic form.

DESCRIPTION OF THE EMBODIMENTS

Figure 1:
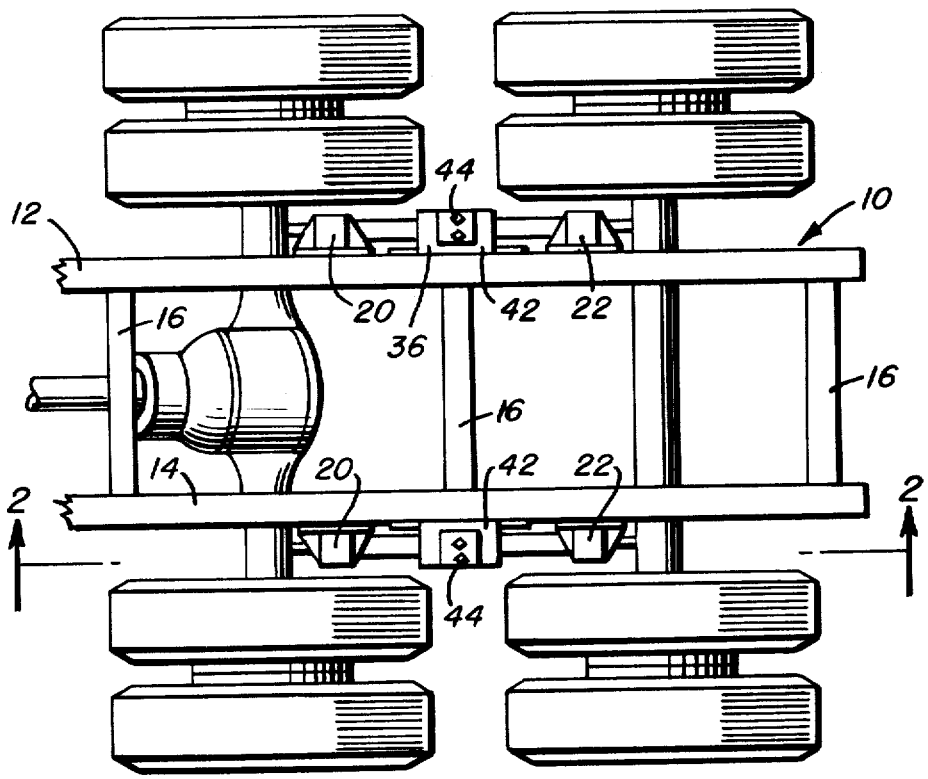
FIG. 1 is a fragmentary plan view of the aft section of a dumping truck or trailer frame and suspension system with the body removed.
Figure 2:
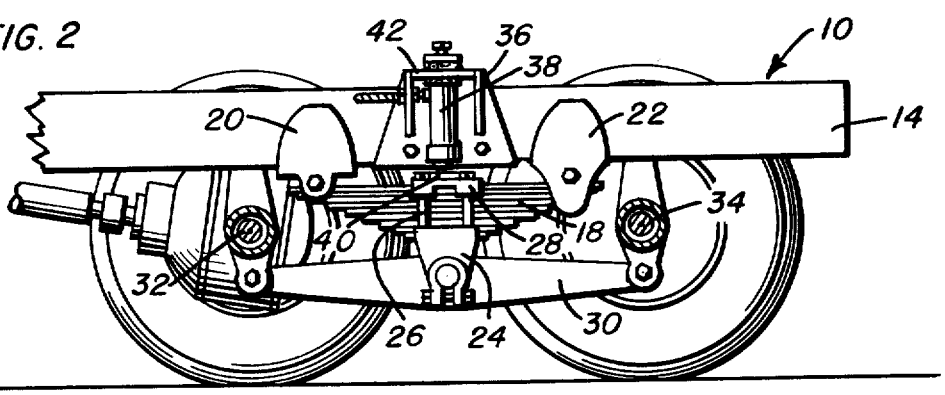
FIG. 2 is a side elevation of the fragmented frame and suspension system illustrated in FIG. 1, and with the springs in a loaded configuration.
Figure 3:
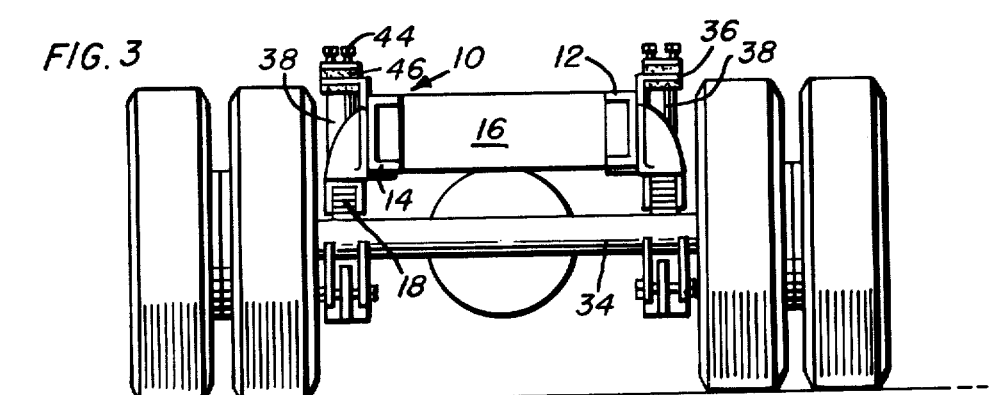
FIG. 3 is a rear elevation of the frame and suspension system illustrated in FIG. 1.
Figure 8:
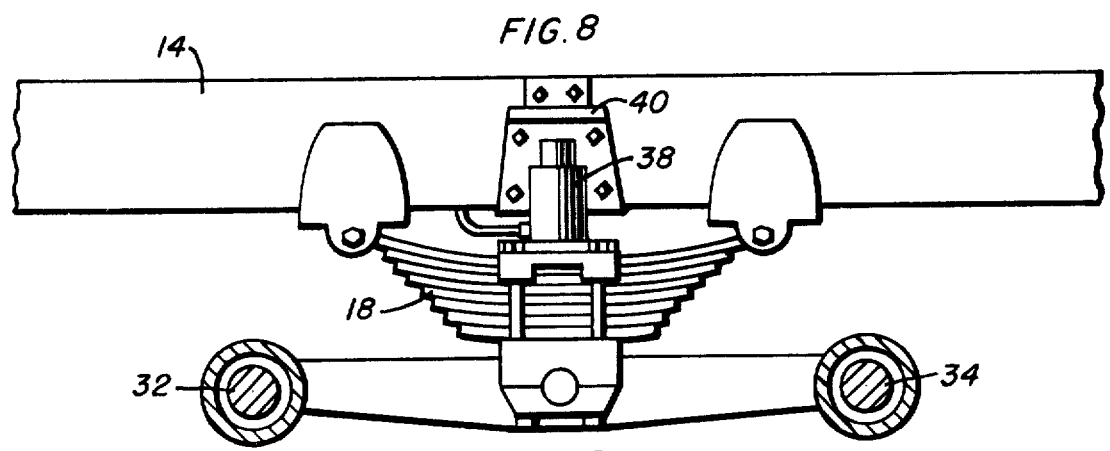
FIG. 8 is a fragmentary side elevation of a Hendrickson suspension system with my invention applied thereto.
Figure 9:
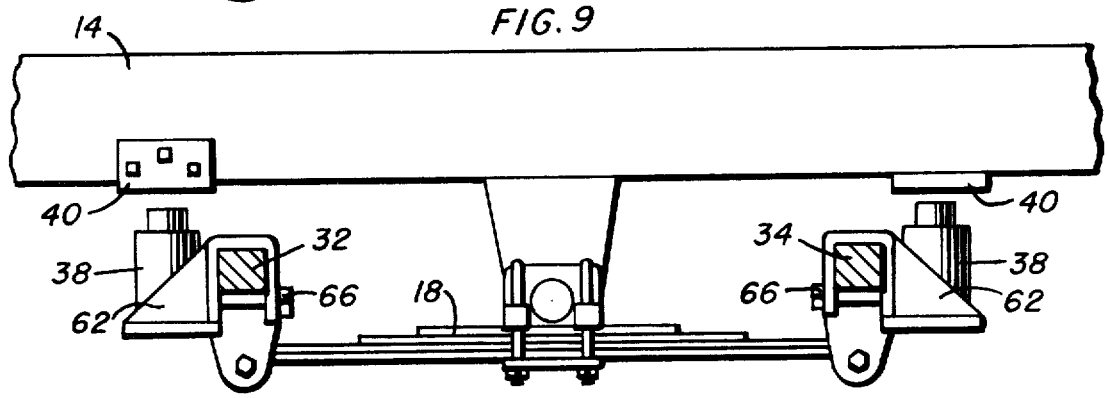
FIG. 9 is a fragmentary side elevation of a Timpken suspension system with my invention applied thereto.

Considering now FIGS. 1-3, a truck frame generally illustrated at 10 includes a pair of frame rails 12 and 14 extending in generally parallel relationship throughout the length of the vehicle and separated from each other by a plurality of cross members 16. A resilient suspension system includes one or more spring members 18 supported on the frame by appropriate brackets 20, 22 rigidly secured to the respective frame rails 12 and 14. A saddle 24 is supported beneath the spring by means of appropriate bolts and clamping elements 26, 28. A walking beam 30 is pivotally carried by the saddle and extends fore and aft of the vehicle body to support appropriate axles 32, 34 of a dual axle suspension system.

Attached to each frame rail on opposite sides thereof is a bracket 36. The bracket is positioned on the frame to support an extensible hydraulic cylinder jack 38 in a position directly over jack pad 40 mounted on the clamping element 28.

The jack 38 is carried by an upper horizontal component 42 of the bracket 36 extending outwardly from the respective frame rails 12, 14. The jack is secured to the upper horizontal component by means of appropriate bolts 44 or other suitable fastening devices. The mount for the jack includes a pair of resilient cushions 46 mounted on opposite sides of the upper horizontal component 42 to cushion the jack and permit some movement to accommodate slight changes in frame-suspension relationship as the lifting forces are applied. A pair of gussets 49 are positioned one on each side of the jack 38 to strengthen the mount and provide protection for the jack body. The bracket 36 may include, if desired, a lower horizontal component 43 extending under the frame rail.

A fluid pressure supply line 48 is connected to an appropriate fluid pressure port 50 in the jack 38 through a relieved area 51 in one of the gussets and, at its opposite end, to an appropriate pressure source to be described hereinafter which will selectively supply pressure fluid to extend the jack piston from its collapsed position, as seen in FIG. 7, to its extended position, as seen in FIGS. 4, 6 and 6A, with the attendant engagement of the jack pad 40. Continued application of pressure fluid will cause extension of the suspension system and ultimately achieve a non-parallel relationship between the vehicle frame and the vehicle axles, as best seen in FIGS. 6, 6A.

Figure 10:
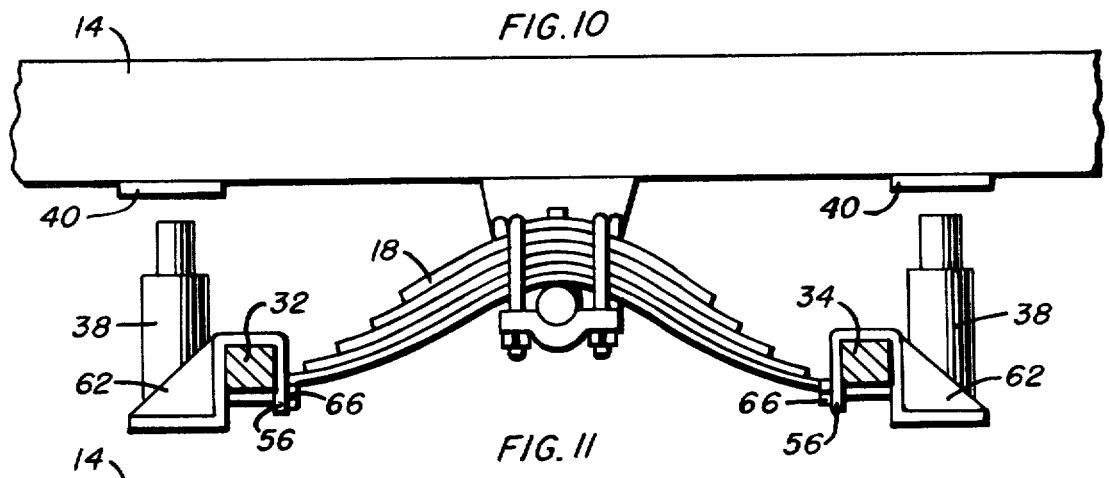
FIG. 10 is a fragmentary side elevation of a Mack suspension system with my invention applied thereto.
Figure 11:
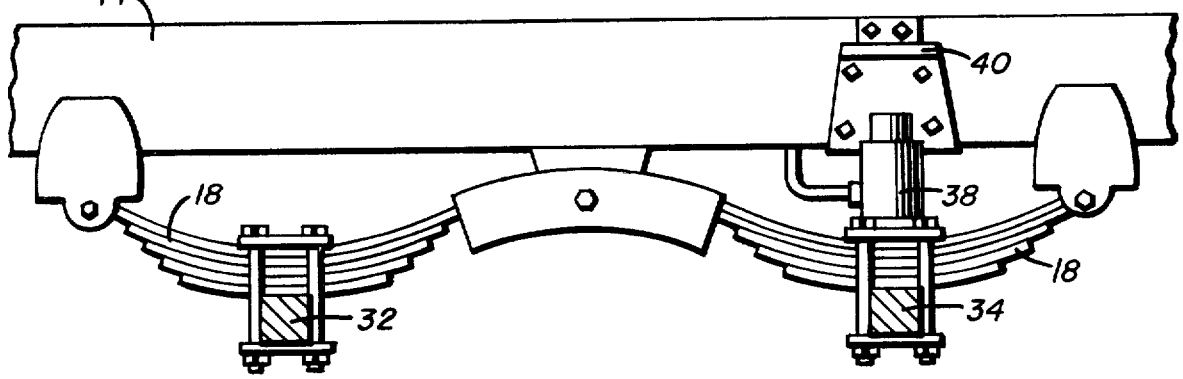
FIG. 11 is a fragmentary side elevation of a Fruehauf suspension system with my invention applied thereto.

In the illustration of FIG. 5, a modification of my system includes a generally U-shaped bracket 52 formed by a pair of vertically oriented legs 54, 56 and a transverse bight 58. The U-shaped bracket 52 supports a platform 60 secured to one of the legs of the bracket by means of a pair of generally triangular webs 62, 64. Appropriate clamping bolts 66 may be employed to secure the bracket 52 to the axle or other appropriate suspension component, as seen in FIGS. 10, 11 and 15. A further modified form of supporting bracket is illustrated at 68 in FIG. 13, it being understood and contemplated that various supporting bracket configurations could be employed in order to accommodate the specific needs of the particular suspension system which is to be augmented. FIGS. 7-15 illustrate typical examples of well known suspension systems with my invention employed thereon in a variety of operative arrangements.

Attention is now directed to the illustration of FIG. 16 which discloses in diagrammatic form the fluid pressure system which I employ to selectively actuate the jacks 38. This system is designed to be remotely controlled by the operator of the vehicle from the driver station and as such, includes an appropriate control box 70 which is connected to the fluid pressure system which may be independently powered by a separate pump, or the like, shown in phantom line at 72 or, alternatively, which may derive its power source from the hydraulic or pneumatic system already incorporated in the vehicle as evidenced by the line 74 connected to the lifting cylinder 76.

Selective actuation of either of the augmenter jacks 38 may be effected by manipulation of the appropriate control handle 80, 82 depending upon which side of the vehicle is to be elevated. The driver may determine this by reference to an appropriate sight gauge 84 positioned within the cab and taking the form of a bubble level or other suitable reference device.

Upon a determination of the "low side" of the vehicle, the driver may then selectively actuate the appropriate handle to extend the jack to a position as best seen in FIG. 2 and upon continued actuation, elevate the frame rail to a sufficient degree to bring the frame of the vehicle to a level condition or to within an acceptable deviation therefrom. Reference to FIG. 6 will illustrate a typical example of the operation of the augmenter with the frame as viewed on the left hand side being raised with respect to the frame member on the right hand side and attendant change in spring configuration.

FIG. 6A further illustrates the extension of the jack 38 to engage the jack pad 40 and thus elevate the frame to within the predetermined acceptable level parameters.

In FIG. 2, it will be noted that the leaves constituting the composite spring construction are generally flat and this, of course, reflects a vehicle in the loaded condition with the jack 38 disassociated from the suspension elements. Comparing this illustration to FIG. 6A, it will be noted that the augmenting jack 38 is extended and has raised the frame, thus permitting the spring leaves to resume their normal arched unloaded configuration, while simultaneously moving the frame of the vehicle and thus its box, bed, or body to the relative position illustrated in FIG. 6.

It is to be recognized that the hydraulic jacks, pumps, and other associated control devices and hardware are of conventional design and have been selected from off the shelf inventories. Generally speaking, the jacks should have approximately a 25 ton capability in view of the size of the vehicles in which this invention is employed, although it is within the contemplation of my invention that smaller or larger capacity equipment may be employed, depending upon the need of the particular vehicle involved. As an example of jacks which I have used successfully in developing this invention, the arrangement illustrated in the preferred embodiment of FIG. 2 employs a 25 ton "Enerpac" cylinder with a single acting solid plunger and a 6¼" stroke identified by Enerpac, Butler, Wisconsin, in Catalog CS 653 as JSS-256. Other cylinders of similar construction may, as hereinbefore, be employed to accommodate the specific physical needs of the suspension systems on which they are utilized. The length of the stroke required in order to move between an operative position wherein pressure is applied to the suspension member and an inoperative position where the augmenting jack is totally disassociated from one element of the suspension system against which its forces would be applied during leveling activity together with appropriate tonnage requirements and physical dimensions are the principal criteria to be considered.

In those situations where it is necessary, appropriate pressure intensifiers may be employed as illustrated at 86 which will boost available pressures to appropriate levels to actuate the cylinders. A typical pressure intensifier is illustrated as the one designated Model EB-65 also available from Enerpac.

It is to be understood that various mounting arrangements may be employed as typified by the illustrations in FIGS. 7-15 and it is within the contemplation of my invention that various combinations of mounting techniques may be utilized in order to facilitate maximum operational efficiency of my invention. Thus, as seen in FIG. 13, one jack 38 may be mounted on an appropriate saddle bracket on the axle member and move its extension cylinder into contact with a pad 40 mounted on the frame of the vehicle, while in the same suspension system, a second jack 38 may be carried on the frame member and move its extension piston into contact with a pad mounted on either the axle, axle housing, or the spring proper as illustrated in FIG. 13 as well as in FIG. 15.

An important feature of my invention resides in the capability of disassociating the lifting jack from the reaction member during periods when leveling activity is not needed. Thus, there are no forces applied to either the jack or the hydraulic system generated by movement of the vehicle in a normal over the road operation. As a result, no continuous wear factors act against the hydraulic system during normal operations and this has proven beneficial in extending the life of the system and insuring its continued integrity. It is also contemplated that where desirable, the hydraulic pressure normally employed to activate the augmenting jacks may be discontinued during normal over the road operations and reinstituted upon actuation of the pump drive mechanism only during those periods when lifting and lowering of frame members is desired.

Although this application illustrates a number of different general types of suspension systems now normally employed in vehicles of the type contemplated, it is to be understood that the invention is not limited to the specific illustrations and embodiments shown and described herein, but contemplates all such arrangements falling within the scope of the appended claims.

I claim:

1. In a vehicle including a frame, wheel and axle means, a suspension system including a plurality of resilient elements interconnecting said wheel and axle means and said frame, a dump body pivotally connected to said frame and movable between raised dumping and lowered transporting positions, a fluid pressure system carried by said vehicle and connected to said dump body to move said body between positions, the combination comprising a fluid pressure operated suspension augmenting device carried by one of and selectively operable between interconnected and disconnected positions between said frame and a portion of said suspension system to apply when interconnected a pressure force between said frame and said portion of said suspension system and change the relationship between at least one of said resilient elements and said frame.

2. The invention defined by claim 1 wherein said suspension augmenting device comprises a fluid pressure operated jack cylinder operable between retracted and extended positions and carried by said frame member, said cylinder including a connection to a controllable supply of pressure fluid and resiliently mounted on said frame for universal movement within preselected parameters, said mount including resilient pad means disposed adjacent said cylinder and resiliently responsive to pressure forces to permit limited movement of said cylinder with respect to said mount.

3. The device of claim 1 wherein said suspension augmenting device comprises at least one fluid pressure cylinder jack carried by at least one of said axle housings of said vehicle and secured thereto by a clamp mount attached to said axle and wherein said cylinder jack is operatively connected to a source of fluid pressure for extending said jack between retracted positions out of engagement with said frame and into position with said frame for applying a lifting pressure to said frame with respect to said axle when in said extended position, said jack cylinder being wholly supported by said axle housing and out of contact with said frame when in its retracted position.

4. The device of claim 1 wherein said suspension augmenting device comprises a fluid pressure operated jack cylinder carried by at least one of said resilient elements of said vehicle suspension system and mounted on said resilient element by means of a clamp, said jack cylinder being operatively connected to a source of fluid pressure carried by said vehicle and movable in response thereto between extended frame engaging and lifting positions and frame disengaging retracted positions wherein said cylinder is totally out of contact with said frame member, said fluid pressure jack cylinder being selectively extendable to engage said frame and elevate said frame with respect to said resilient element, whereby to elevate said frame of said vehicle with respect to said suspension system on at least one side of said vehicle.

5. The suspension augmenting device of claim 1 comprising a plurality of hydraulic jack cylinders on at least one side of said vehicle frame and supported thereon by means of a frame attached mount, each of said plurality of fluid pressure jack cylinders being connected to a source of pressure fluid and including elements movable between extended suspension engaging and force applying positions and a retracted position out of contact with said suspension member whereby at least one of said plurality of cylinders may be extended to apply a lifting force to said frame by engagement with said suspension element to elevate at least one side of said frame with respect to said suspension system.

6. The suspension augmenting device of claim 1 wherein control means and level reference means are positioned at the driver position in said vehicle and operable to selectively control the supply of pressure fluid to said fluid pressure jack cylinders to extend and retract said jack cylinders in accordance with said reference means to elevate one side of said vehicle with respect to the other side to bring said frame into an acceptable relationship with respect to level.

* * * * *